(12) United States Patent
Kim et al.

(10) Patent No.: US 8,860,894 B2
(45) Date of Patent: Oct. 14, 2014

(54) ELECTRIC FIELD DRIVEN LIQUID CRYSTAL LENS CELL AND STEREOSCOPIC IMAGE DISPLAY DEVICE USING THE SAME

(75) Inventors: Sung-Woo Kim, Gyeonggi-do (KR); Seung-Chul Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 831 days.

(21) Appl. No.: 12/958,833

(22) Filed: Dec. 2, 2010

(65) Prior Publication Data

US 2011/0157498 A1  Jun. 30, 2011

(30) Foreign Application Priority Data

Dec. 30, 2009 (KR) .................. 10-2009-0134355

(51) Int. Cl.
*H04N 13/02* (2006.01)
*G02F 1/1335* (2006.01)
*H04N 13/04* (2006.01)
*G02F 1/29* (2006.01)

(52) U.S. Cl.
CPC ...... *G01F 1/134309* (2013.01); *H04N 13/0452* (2013.01); *G01F 2001/134381* (2013.01); *G02F 2001/294* (2013.01); *G02F 2203/24* (2013.01); *H04N 13/0404* (2013.01)
USPC ............................................. 349/15; 348/51

(58) Field of Classification Search
CPC ................................................. H04N 13/0452
USPC ............................................. 349/15; 348/51
See application file for complete search history.

(56) References Cited

U.S. PATENT DOCUMENTS

2009/0153754 A1* 6/2009 Jung ................................. 349/15
2011/0157496 A1* 6/2011 Im ................................. 349/15

FOREIGN PATENT DOCUMENTS

CN       101464578 A       6/2009

OTHER PUBLICATIONS

Office Action issued in counterpart Chinese Patent Application No. 201010509725.5 dated Oct. 26, 2012 (with English translation).

* cited by examiner

*Primary Examiner* — Eric Wong
(74) *Attorney, Agent, or Firm* — Morgan, Lewis & Bockius LLP

(57) ABSTRACT

An electric field driven liquid crystal lens including a first substrate and a second substrate arranged opposite each other, a first plurality of split electrodes formed on the first substrate, each of the first plurality of split electrodes corresponding to one of a plurality of lens regions, a second plurality of split electrodes formed on the first plurality of split electrodes, each of the second plurality of split electrodes corresponding to one of the plurality of lens regions, a second electrode formed over an entire first surface of the second substrate, a first alignment film formed over an entire surface of the first substrate including the first and second plurality of split electrodes, the first alignment film having a first rubbing direction, a liquid crystal layer disposed between the first substrate and the second substrate, and a polarizer plate formed on a second surface of the second substrate, the polarizer plate having a transmission axis that is in a range of ±10 degrees from the first rubbing direction.

10 Claims, 6 Drawing Sheets

ELECTRIC FIELD DRIVEN LIQUID CRYSTAL LENS CELL AND STEREOSCOPIC IMAGE DISPLAY DEVICE USING THE SAME

This application claims the benefit of Korean Patent Application No. 10-2009-0134355 filed on Dec. 30, 2009, which is hereby incorporated by reference.

BACKGROUND OF THE INVENTION

1. Field of the Invention

The present invention relates to an electric field driven liquid crystal lens, and more particularly, to an electric field driven liquid crystal lens in which a polarizer plate is provided above a lower substrate having finely split electrodes, thereby preventing horizontal lens distortion due to a horizontal electric field created between the neighboring electrodes, and a stereoscopic display device using the same.

2. Discussion of the Related Art

At present, services for rapid dissemination of information, are provided based on the construction of high-speed information communication networks, have developed from a simple "listening and speaking" service, such as current telephones, to a "watching and listening" multimedia type service based on digital terminals used for high-speed processing of characters, voices, and images. Such services are expected to ultimately be developed into hyperspace 3-dimensional (3D) stereoscopic information communication services enabling virtual reality and stereoscopic viewing free from the restrains of time and space.

In general, stereoscopic images representing 3-dimensions are realized based on the principle of stereo-vision via the viewer's eyes. Since the viewer's eyes are spaced apart from each other by about 65 mm, i.e. have a binocular parallax, the left and right eyes perceive slightly different images due to the positional difference between the two eyes. Such an image difference due to the positional difference between the two eyes is called binocular disparity. A 3D stereoscopic image display device is designed based on binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately combines the images, reproducing depth perception and realism of an original 3D image. This ability is referred to as stereography (stereoscopy), and a display device to which stereoscopy is applied is referred to as a stereoscopic display device.

Stereoscopic display devices may be classified based on constituent elements of a lens which realizes 3D images. In one example, a lens using a liquid crystal layer is referred to as an electric field driven liquid crystal lens.

Generally, a liquid crystal display device includes two electrodes opposite each other, and a liquid crystal layer interposed between the two electrodes. Liquid crystal molecules of the liquid crystal layer are driven by an electric field created when voltages are applied to the two electrodes. The liquid crystal molecules have polarization and optical anisotropy characteristics. Here, polarization refers to a change in molecular arrangement direction according an electric field, which is caused as electrons in liquid crystal molecules are gathered to opposite sides of the liquid crystal molecules when the liquid crystal molecules are under the influence of an electric field. Also, optical anisotropy refers to a change in path or polarization of light to be emitted according to an incidence direction or polarization of incident light, which is caused by an elongated shape of liquid crystal molecules and the above-mentioned molecular arrangement direction.

Accordingly, the liquid crystal layer has a transmittance difference due to voltages applied to the two electrodes, and is able to display an image by varying the transmittance difference on a per pixel basis.

Recently, an electric field driven liquid crystal lens in which a liquid crystal layer serves as a lens based on the above-described characteristics of liquid crystal molecules has been proposed. Specifically, a lens is designed to control a path of incident light on a per position basis using a difference between a refractive index of the lens constituent material and the refractive index of air. In the electric field driven liquid crystal lens, if different voltages are applied to electrodes located at different positions of the liquid crystal layer so as to create an electric field required to drive the liquid crystal layer, incident light introduced into the liquid crystal layer undergoes different phase variations on a per position basis, and as a result, the liquid crystal layer is able to control the path of incident light in the same manner as an actual lens.

FIG. 1 is a sectional view illustrating an electric field driven liquid crystal lens according to the related art, and FIG. 2 is a schematic view illustrating a potential distribution of the electric field driven liquid crystal lens of FIG. 1 after voltage is applied to the electric field driven liquid crystal lens.

As illustrated in FIG. 1, the electric field driven liquid crystal lens of the related art includes first and second substrates 10 and 20 opposite each other, and a liquid crystal layer 30 formed between the first substrate 10 and the second substrate 20.

First electrodes 11 are arranged on the first substrate 10 and are spaced apart from one another by a first distance. In the two neighboring first electrodes 11, a distance from the center of one first electrode 11 to the center of the other first electrode 11 is referred to as a "pitch." Repeating the same pitch for the respective first electrodes results in a pattern.

A second electrode 21 is formed over the entire surface of the second substrate 20 opposite the first substrate 10. The first and second electrodes 11 and 21 are made of transparent metal. The liquid crystal layer 30 is formed in a space between the first electrodes 11 and the second electrode 21. Liquid crystal molecules of the liquid crystal layer 30 have a parabolic potential surface due to a property reacting according to the intensity and distribution of an electric field and thus, have a phase distribution similar to that of the electric field driven liquid crystal lens as illustrated in FIG. 2.

The above-described electric field driven liquid crystal lens is realized under the condition that high voltages are applied to the first electrode 11 and the second electrode 21 are grounded. With this voltage condition, a vertical electric field is strongest at the center of the first electrode 11, and the intensity of the vertical electric field decreases away from the first electrode 11. Accordingly, if the liquid crystal molecules of the liquid crystal layer 30 have positive dielectric anisotropy, the liquid crystal molecules are arranged according to the electric field in such a way that the liquid crystal molecules are upright at the center of the first electrode 11 and are gradually tilted approximately horizontally away from the first electrode 11. As a result, in view of light transmission, an optical path is shortened at the center of the first electrode 11, and is lengthened with increasing distance from the center of the first electrode 11, as illustrated in FIG. 2. Representing the length variation of the optical path using a phase surface, the electric field driven liquid crystal lens has light transmission effects similar to a lens having a parabolic surface.

Here, the second electrode 21 causes behavior of the electric field created by the liquid crystal molecules, making a refractive index of light spatially take the form of a parabolic function. The first electrode 11 corresponds to a lens edge region. In this case, relatively high voltages are applied to the first electrodes 11 rather than the second electrode 21. Therefore, as illustrated in FIG. 2, an electric potential difference occurs between the first electrodes 11 and the second electrode 21. In particular, a steep lateral electric field is created around the first electrodes 11. Accordingly, liquid crystals have a slightly distorted distribution rather than a predetermined distribution, whereby a refractive index of light cannot exhibit parabolic spatial distribution, or movement of the liquid crystals is excessively sensitive to voltage variation.

The above-described electric field driven liquid crystal lens of the related art may be realized, without a lens having a parabolic surface, by arranging electrodes on two substrates with liquid crystals interposed therebetween and applying voltages to the electrodes. However, the above described electric field driven liquid crystal lens has the following problems.

Firstly, since the electrodes formed on the lower substrate are positioned at only a part of a lens region, a steep lateral electric field, rather than a gentle electric field, is created between a lens edge region corresponding to the electrode and a lens center region, resulting in a slightly distorted phase of the electric field driven liquid crystal lens. In particular, in the electric field driven liquid crystal lens that is driven by a liquid crystal field, since the greater the pitch of lens regions, the smaller the number of electrodes to which high voltages are applied, an insufficient electric field is created between the high voltage electrodes and a substrate opposite these electrodes. Accordingly, it becomes difficult to form the electric field driven liquid crystal lens having a gentle parabolic lens surface, which has the same effects as an actual lens.

Secondly, when being applied to a large-area display device, the lens center region, which is distant from the lens edge region where the electrode to which high-voltage is applied is located, is substantially unaffected by an electric field and has a difficulty in alignment control of liquid crystals by the electric field. If the alignment control in the lens center region is difficult or impossible, the resulting electric field driven liquid crystal lens has a discontinuous lens profile and is ineffective as a lens.

Thirdly, since a vertical electric field, created between an electrode to which a high voltage is applied and an electrode formed over the entire surface of a substrate opposite the high voltage electrode, causes a high height, i.e. high sag of the electric field driven liquid crystal lens and also, the electric field driven liquid crystal lens requires upper and lower sag margins, a great quantity of liquid crystals may be required to form the entire electric field driven liquid crystal lens. In particular, since the greater the sag of the electric field driven liquid crystal lens, the greater the quantity of liquid crystals on a per volume basis, this may result in cost increase and serious deterioration in process efficiency.

Fourthly, a focal distance of the electric field driven liquid crystal lens is inversely proportional to the sag of the electric field driven liquid crystal lens. To fabricate an electric field driven liquid crystal lens having a short focal distance, there is a need for a liquid crystal layer having a large thickness and this becomes a main factor of cost increase. In particular, since the quantity of very expensive liquid crystals increases on a per volume basis as a cell gap increases, there is an increasing demand to reduce the cell gap.

In order to assure a constant lens profile in the electric field driven liquid crystal lens of the related art, the thickness of the liquid crystal layer, i.e. the cell gap must be 30 µm or more and in particular, in the case of a large-area one having a large pitch, the thickness of the liquid crystal layer is further increased. However, an array process for a display panel, such as a liquid crystal panel, forms a cell gap of 10 µm or less, and therefore, is difficult to form the above described high large cell gap of the liquid crystal layer. That is, a current array process forming a liquid crystal panel is difficult to form the liquid crystal layer of the above described electric field driven liquid crystal lens.

Fifthly, although a Fresnel lens has been proposed in an effort to reduce the above described cell gap, the Fresnel lens has discontinuous surfaces between the respective neighboring sub regions of each lens region having different maximum height points, and thus, causes deterioration in display grade.

SUMMARY OF THE INVENTION

Accordingly, the present invention is directed to an electric field driven liquid crystal lens and stereoscopic display device using the same that substantially obviates one or more problems due to limitations and disadvantages of the related art.

An object of the present invention is to provide an electric field driven liquid crystal lens, and a stereoscopic display device using the same.

Another object of the present invention is to provide an electric field driven liquid crystal lens in which a polarizer plate is provided above a lower substrate provided with finely split electrodes, thereby preventing horizontal lens distortion due to a horizontal electric field created between the neighboring electrodes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the electric field driven liquid crystal lens and stereoscopic display device using the same includes an electric field driven liquid crystal lens including a first substrate and a second substrate arranged opposite each other, a first plurality of split electrodes formed on the first substrate, each of the first plurality of split electrodes corresponding to one of a plurality of lens regions, a second plurality of split electrodes formed on the first plurality of split electrodes, each of the second plurality of split electrodes corresponding to one of the plurality of lens regions, a second electrode formed over an entire first surface of the second substrate, a first alignment film formed over an entire surface of the first substrate including the first and second plurality of split electrodes, the first alignment film having a first rubbing direction, a liquid crystal layer disposed between the first substrate and the second substrate, and a polarizer plate formed on a second surface of the second substrate, the polarizer plate having a transmission axis that is in a range of ±10 degrees from the first rubbing direction.

In another aspect, the electric field driven liquid crystal lens and stereoscopic display device using the same includes a stereoscopic display device including a display panel to emit a 2-dimensional (2D) image signal, and an electric field driven liquid crystal lens that converts the 2D image signal into a 3-dimensional (3D) image signal, the electric field driven liquid crystal lens including a first substrate and a second substrate arranged opposite each other, a first plurality of split electrodes formed on the first substrate, each of the first plurality of split electrodes corresponding to one of a plurality of lens regions, a second plurality of split electrodes formed on the first plurality of split electrodes, each of the second plurality of split electrodes corresponding to one of the plurality of lens regions, a second electrode formed over an entire first surface of the second substrate, a first alignment film formed over an entire surface of the first substrate including the first and second plurality of split electrodes, the first alignment film having a first rubbing direction, a liquid crystal layer disposed between the first substrate and the second substrate, and a polarizer plate formed on a second surface of the second substrate, the polarizer plate having a transmission axis that is in a range of ±10 degrees from the first rubbing direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

The present invention proposes a configuration of an electric field driven liquid crystal lens in which each lens region is provided with finely split electrodes and different voltages are applied to the respective electrodes because an electric field driven liquid crystal lens having a single electrode in each lens region is difficult to control a fine lens profile. In the proposed configuration, a lower substrate is provided with first finely split electrodes, and an upper substrate is provided over the entire surface thereof with a second electrode, such that the electric field driven liquid crystal lens is driven by a vertical electric field created between the first electrodes and the second electrode. In addition, the present invention proposes that the lower substrate provided with the first finely split electrodes has a rubbing direction parallel to a longitudinal direction of the electrodes. Hereinafter, alignment characteristics of liquid crystals appearing in the above described configuration will be described.

Figure 1:
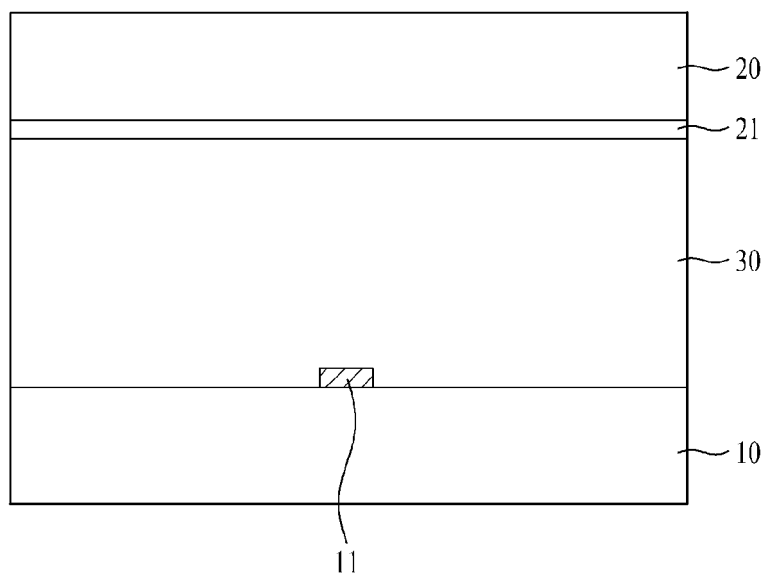
FIG. 1 is a sectional view illustrating an electric field driven liquid crystal lens according to the related art.
Figure 2:
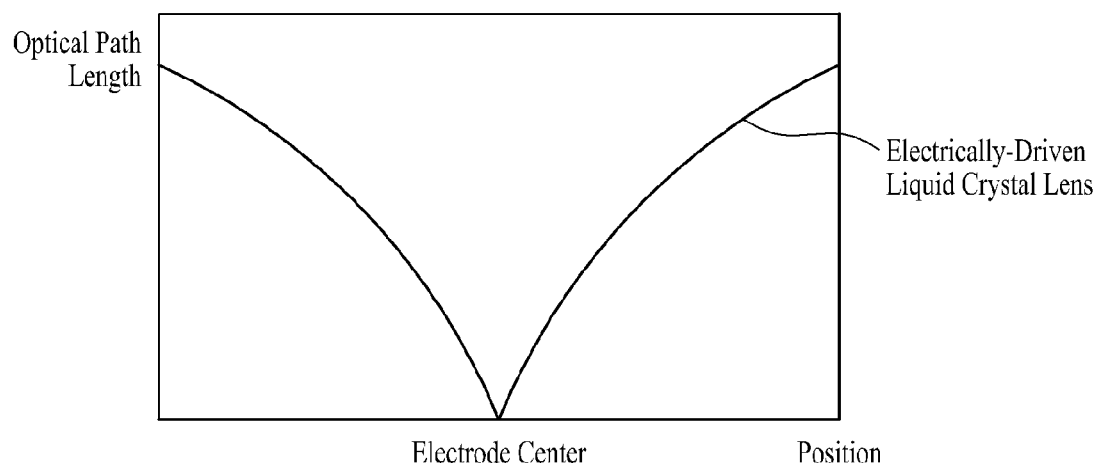
FIG. 2 is a view illustrating a potential distribution after voltage is applied to the electric field driven liquid crystal lens of FIG. 1.
Figure 3A:
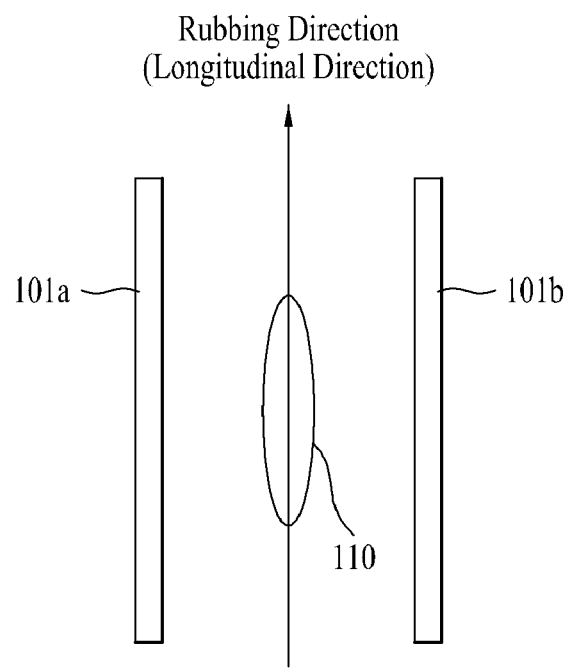
FIGS. 3A and 3B are views illustrating alignment of liquid crystals, respectively, when no voltage is applied to electrodes and when voltage is applied to electrodes when rubbing is performed in a direction parallel to a longitudinal direction of electrodes.
Figure 3B:
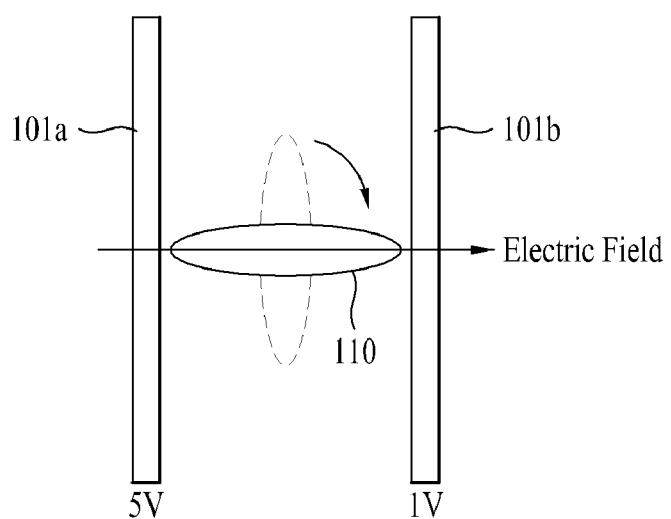

FIGS. 3A and 3B are views illustrating alignment of liquid crystals, respectively, when no voltage is applied to the electrodes and when voltage is applied to the electrodes during rubbing performed in a direction parallel to the longitudinal direction of the electrodes.

In a finely split electrode configuration, if rubbing is performed in a direction parallel to a longitudinal direction of first finely split electrodes 101a and 101b as illustrated in FIG. 3A, liquid crystal molecules 110 are aligned in the rubbing direction parallel to the first finely split electrodes 101a and 101b in an initial state in which no voltage is applied. Then, when voltages are applied to the first finely split electrodes and a second electrode of the electric field driven liquid crystal lens, a vertical electric field is created between the first electrodes and the second electrode, and thus, an electric field to drive liquid crystals is created by a difference in refractive indices of the liquid crystals aligned in different phase surfaces.

In the meantime, when voltages are applied to the first finely split electrodes 101a and 101b as illustrated in FIG. 3B, a horizontal electric field is created by the first finely split electrodes 101a and 101b, and also, due to a voltage difference between the first finely split electrodes 101a and 101b. When the lower substrate is strongly affected by the horizontal electric field in addition to the vertical electric field for lens driving, this causes horizontal distortion of liquid crystal molecules, making it impossible for the resulting lens to function normally.

In particular, the voltages applied to the first finely split electrodes 101a and 101b formed on the lower substrate may be high voltages suitable to reduce a cell gap of a liquid crystal layer. For example, if it is assumed that the voltages applied respectively to the neighboring first finely split electrodes 101a and 101b are 5V and 1V, a horizontal electric field is created between the two neighboring electrodes. Therefore, the liquid crystal molecules 110, which have been aligned in a longitudinal direction of the electrodes in a state in which no voltage is applied to the electrodes, may be distorted to follow a direction of the horizontal electric field, and consequently, may be aligned in a crosswise direction of the electrodes 101a and 101b. This phenomenon occurs more intensely in liquid crystal molecules 110 close to the lower substrate provided with the first finely split electrodes 101a and 101b.

Figure 4:
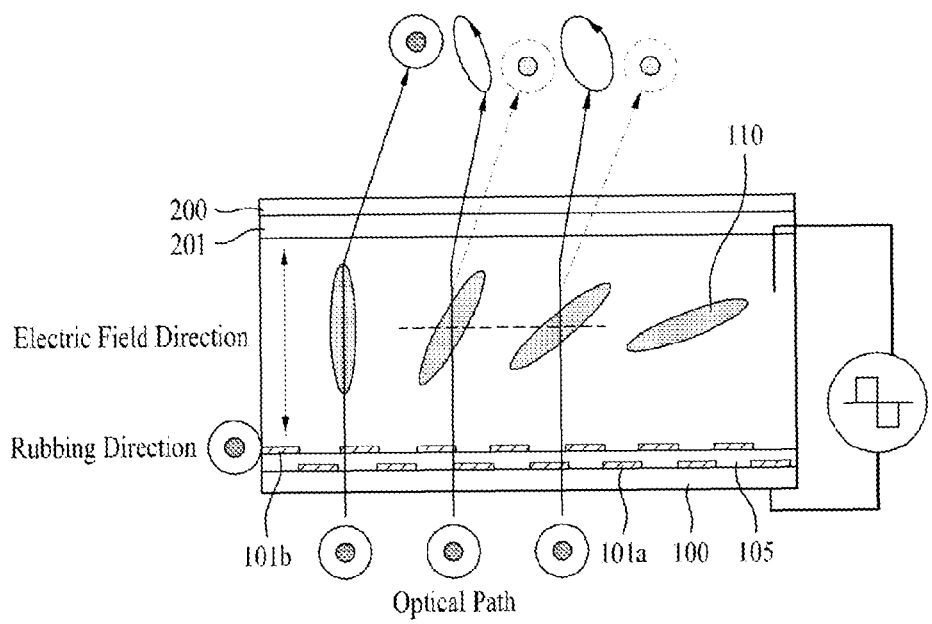
FIG. 4 is a view illustrating an optical path on a per region basis of the electric field driven liquid crystal lens having an electrode conformation of FIGS. 3A and 3B.

FIG. 4 is a view illustrating an optical path on a per region basis of the electric field driven liquid crystal lens having an electrode conformation of FIGS. 3A and 3B.

As illustrated in FIG. 4, the electric field driven liquid crystal lens having the above described finely split electrode configuration includes a first substrate 100 and a second substrate 200 arranged opposite each other, a plurality of first electrodes 101*a* and 101*b* formed in different layers on the first substrate 100 and an insulating film 105 in each lens region, a second electrode 201 formed over the entire surface of the second substrate 200, and liquid crystal molecules 110 in a liquid crystal layer. Although not shown, an alignment film is coated over the insulating film 105 including the first electrodes 101*b* of an upper electrode layer. The alignment film has a rubbing direction in one longitudinal axis, i.e. a rubbing direction parallel to a longitudinal direction of the first electrodes 101*a* and 101*b*.

In this case, when the electric field driven liquid crystal lens is driven by applying voltages to the first electrodes 101*a* and 101*b* and the second electrode 201, a path of light is directed in the direction in the one longitudinal axis prior to passing through the electric field driven liquid crystal lens, and then, while passing through the electric field driven liquid crystal lens, is changed according to alignment of the liquid crystal molecules 110 in the liquid crystal layer. More particularly, light is directed in the direction in the one longitudinal axis while passing through the liquid crystal molecules that are upright, but linearly polarized light deviates from a normal path and is changed into circularly polarized light when the light passes through the liquid crystal molecules 110 that are tilted obliquely, causing optical interference to a viewer and resulting in deterioration in stereoscopic display visibility. In this case, the horizontal electric field caused by a voltage difference between the first finely split electrodes 101*a* and 101*b* causes the liquid crystal molecules to be tilted obliquely.

In the electric field driven liquid crystal lens, as the thickness of the liquid crystal layer filled between the first substrate 100 and the second substrate 200 increases, a required quantity of liquid crystals proportionally increases on a per volume basis. In particular, since the liquid crystals are very expensive, it has been attempted to reduce the thickness of the liquid crystal layer.

As described above, in the case of the electric field driven liquid crystal lens defining a single parabolic lens on a per pitch basis, since the parabolic lens on a per pitch basis has a high height, the liquid crystal layer requires a thickness calculated by adding a predetermined margin to the height of the parabolic lens. Accordingly, the thickness of the liquid crystal layer must have a high value and thus, the quantity of liquid crystals to form the liquid crystal layer must be increased. This has a risk of increasing process costs and deteriorating process efficiency.

In addition, if a liquid crystal panel is provided below the electric field driven liquid crystal lens, the thickness of a liquid crystal layer included in the liquid crystal panel is set in a range of 3~5 μm. However, in the case of the electric field driven liquid crystal lens defining a single parabolic lens on a per pitch basis, since the liquid crystal layer has a thickness of 30 μm or more, forming the liquid crystal layer of the electric field driven liquid crystal lens using a general liquid crystal layer forming process results in considerable deterioration in process efficiency.

Figure 5:
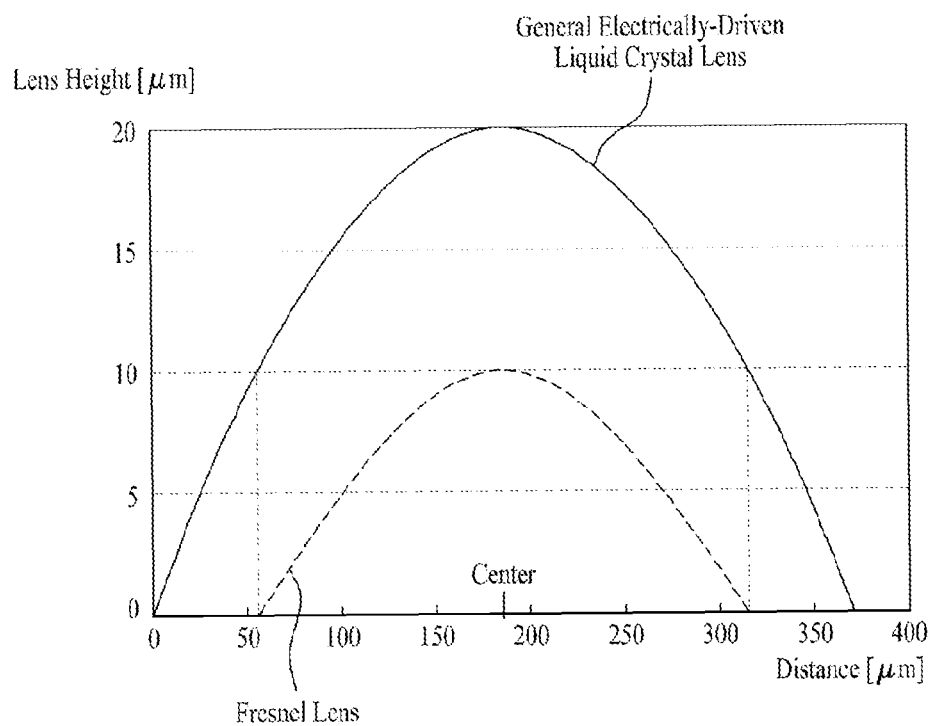
FIG. 5 is a view comparing a Fresnel lens having a discontinuous surface with a general electric field driven liquid crystal lens.

An example adopting a Fresnel lens to reduce the thickness of the liquid crystal layer will now be described. A Fresnel lens is a type of condensing lens, and is divided into several bands to reduce thickness, and each band has a prism function to reduce aberration. FIG. 5 is a view comparing a Fresnel lens having a discontinuous surface with a general electric field driven liquid crystal lens.

As illustrated in FIG. 5, for example, to apply the Fresnel lens to the electric field driven liquid crystal lens, one pitch is divided into a plurality of sections, and a center section defines a parabolic lens having a relatively small height and the remaining left and right sections respectively define a curved surface of an imaginary parabolic lens having a height equal to the maximum height of the Fresnel lens.

Upon application of the Fresnel lens, a discontinuous surface is formed at a boundary between the center parabolic lens and the curved surface of the left or right imaginary parabolic lens. However, when the above-described Fresnel lens is applied to the electric field driven liquid crystal lens, a width corresponding to one pitch is small and thus, there is a limit in division of one pitch. Furthermore, the boundary between the divided sections has an error value including the discontinuous surface, causing distortion in transmission of light in the electric field driven liquid crystal lens.

Figure 6:
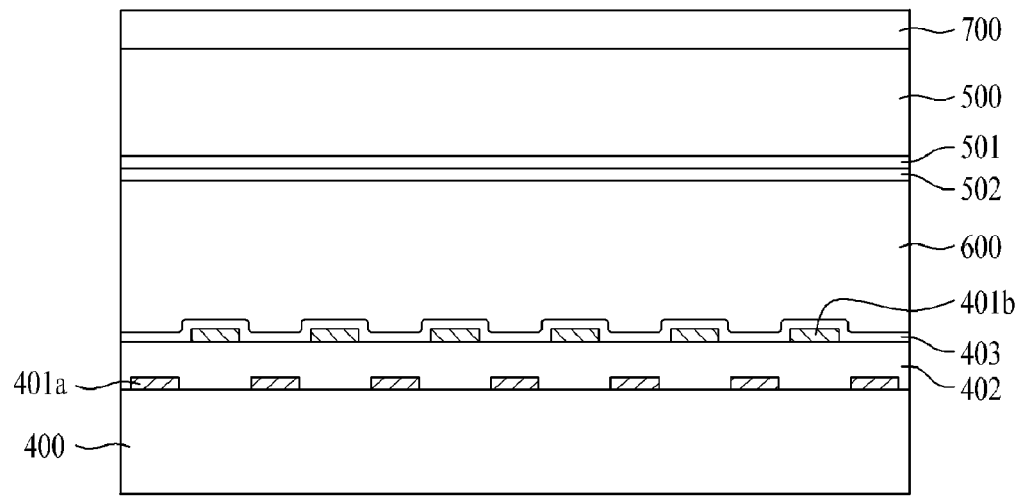
FIG. 6 is a sectional view illustrating an electric field driven liquid crystal lens according to an exemplary embodiment of the present invention.
Figure 7:
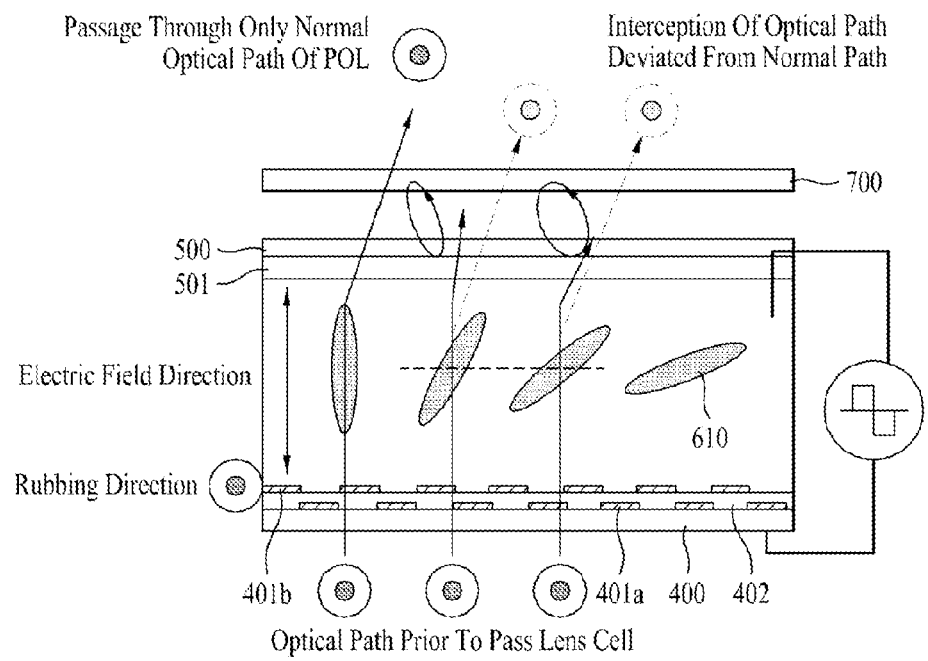
FIG. 7 is a view illustrating an optical path on a per region basis of FIG. 6.

FIG. 6 is a sectional view illustrating the electric field driven liquid crystal lens according to an exemplary embodiment of the present invention, and FIG. 7 is a view illustrating an optical path on a per region basis of FIG. 6.

As illustrated in FIG. 6, the electric field driven liquid crystal lens includes a first substrate 400 and a second substrate 500 arranged opposite each other and each defining a plurality of lens regions to correspond to those of the other substrate, a plurality of first electrodes 401*a* and 401*b* equidistantly spaced apart from one another on the first substrate 400 in each lens region, a second electrode 501 formed over the entire surface of the second substrate 500, a voltage source to apply different voltages Vmin, V1, V2, . . . Vmax to the first electrodes 401*a* and 401*b*, a first alignment film 403 formed over the entire surface of the first substrate 400 including the first electrodes 401*a* and 401*b* and having a first rubbing direction, a second alignment film 502 formed over the entire surface of the second substrate 500 including the second electrode 501, a liquid crystal layer 600 filled between the first substrate 400 and the second substrate 500, and a polarizer plate 700 formed on an back surface of the second substrate 500 and having a transmission axis, which is identical to the first rubbing direction or is in a range of ±10 degrees from the first rubbing direction.

The polarizer plate 700 has the transmission axis that is identical to the first rubbing direction of the first alignment film 403 or is in a range of ±10 degrees from the first rubbing direction to selectively transmit only a part of light directed from a display panel below the electric field driven liquid crystal lens, i.e. light having passed through liquid crystal molecules that are affected by a normal vertical electric field. More specifically, the polarizer plate 700 serves to intercept an optical path, which is defined by horizontally distorted liquid crystal molecules caused in the above described finely split electrode configuration, or an optical path, which is more frequently shown at a discontinuous lens surface at the boundary between the sub regions caused in the Fresnel lens, thereby removing any interference due to both the optical paths.

Here, a transmission axis of the polarizer plate 700 is identical to a rubbing axis of the electric field driven liquid crystal lens, more particularly, a rubbing axis of the first substrate 400, or is in a range of ±10 degrees from the rubbing axis (i.e. the first rubbing direction), and thus, the polarizer plate 700 transmits only light having the same direction as the transmission axis while intercepting light except for the transmission axis. That is, the polarizer plate 700 intercepts light having circularly polarized abnormal optical paths.

The above described polarizer plate 700 is attached to the surface of the second substrate 200. In addition, a single electric field driven liquid crystal lens contains periodically repeated lens regions having an optical path difference.

The first electrodes 401*a* and 401*b* may be equidistantly spaced apart from one another as illustrated, or may have a variable interval gradually increasing or decreasing from the edge to the center of the lens region. The first electrodes 401a and 401b may be spaced apart from one another in a single layer, or may be divided in different layers such that the first electrodes 401a are arranged on the first substrate 400 and the first electrodes 401b are arranged on the insulating film 402 as illustrated. In the latter case, the first electrodes 401a or 401b in the same layer may be spaced apart from one another by an increased distance to prevent a short-circuit between the neighboring first electrodes 401a or 401b having a small width. Furthermore, from the plane view, all the first electrodes 401a and 401b may be densely arranged to substantially cover the entire surface of the first substrate 400.

The first electrodes 401a and 401b and the second electrode 501 are made of transparent metal, to prevent transmittance loss at locations where the respective electrodes are located.

With respect to each lens region L, a first voltage Vmin, which is approximately equal to a threshold voltage, is applied to the first electrode located at the center O of the lens region L, whereas the highest nth voltage Vmax is applied to the first electrode located at the edge E of the lens region L. In this case, voltages applied to the first electrodes 401a and 401b, located between the center O and the edge E of the lens region L, range from the threshold voltage Vmin to the nth voltage Vmax of the lens region L, and gradually increase with increasing distance from the center O of the lens region L. When the voltages are applied to the plurality of first electrodes 401a and 401b, a ground voltage is applied to the second electrode 501, whereby a vertical electric field is created between the first electrodes 401a and 401b and the second electrode 501.

Upon the above described voltage application, it is desirable that a difference in the voltages applied to the neighboring first electrodes 401a and 401b be 1V or less, so that an excessively strong horizontal electric field is not created between the first electrodes 401a and 401b.

The plurality of first electrodes 401a and 401b are horizontally symmetrically formed about the edge E of the lens region L. The respective first electrodes 401a and 401b are connected to the corresponding voltage signal sources Vmin, V1, V2, . . . Vmax via metal lines (not shown) in a pad portion (corresponding to a non-display portion of the display panel 350), such that corresponding voltages are applied to the first electrodes 401a and 401b.

Here, the lowest one of the voltages applied to the first electrode, i.e. the threshold voltage V0 is an alternating current (AC) square wave voltage having a peak value of about 1.4~2V. The threshold voltage V0 is given by $$V = \pi\sqrt{\frac{K1}{\Delta\varepsilon\varepsilon 0}},$$

where, $\Delta\in$ is the dielectric anisotropy of liquid crystals, K1 is the modulus of elasticity of liquid crystals, and $\in 0$ is a free-space dielectric constant. In addition, the highest voltage Vmax of the voltages applied to the first electrodes, i.e. the voltage applied to the first electrode positioned at the edge of the lens region is an AC square wave voltage having a peak value of about 2.5~10V.

If it is assumed that the width of the lens region L is a pitch P, a distance between the center O and the edge E of the lens region L is equal to P/2. This means that symmetrical values of voltages are applied to the symmetrical first electrodes 401a and 401b from the edge E to the center O of the lens region L.

The first alignment film 403 and the second alignment film 502 are formed on the first substrate 400 including the first electrodes 401a and 401b and on the second electrode 501, respectively. In this case, to allow the electric field driven liquid crystal lens 1000 to function as a transparent layer in an initial state in which no voltage is applied thereto, the first alignment film 403 may have a rubbing direction parallel to or perpendicular to a longitudinal direction of the first electrodes 401a and 401b (in the drawing, the rubbing direction is parallel to the longitudinal direction of the first electrodes 401a and 401b). In this case, the second alignment film 502 has a rubbing direction parallel or anti-parallel to the rubbing direction of the first alignment film (here, the term "anti-parallel" means a parallel direction having an opposite traveling direction). Therefore, the electric field driven liquid crystal lens may directly pass an image, transmitted from the display panel located therebelow, to the viewer. In any case, the rubbing direction of the first alignment film 403 may be identical to the transmission axis of the polarizer plate 700, or the transmission axis of the polarizer plate 700 may be set in a range of ±10 degrees from the rubbing direction of the first alignment film 403.

The plurality of first electrodes 401a and 401b have a bar shape extending in a crosswise direction of the first substrate 400 or the insulating film 402 (i.e., a direction of one side of the first substrate 400). Each of the first electrodes 401a and 401b has a width of 1~10 μm, and a distance between the two neighboring first electrodes 401a and 401b is in a range of 1~10 μm. For example, the pitch is variable in a range of 90 μm to 1,000 μm and, approximately ten to one hundred or more first electrodes may be formed on a per lens region basis according to the above described width and distance of the first electrodes 401a and 401b.

A seal pattern (not shown) is formed at an outer peripheral region of the first and second substrates 400 and 500 (i.e., a non-display region including a pad portion) to support a gap between the first substrate 400 and the second substrate 500. The liquid crystal layer 600 between the first substrate 400 and the second substrate 500 must have a sufficient thickness equal to about 15 μm or more, in order to form a sufficient phase of the electric field driven liquid crystal lens. To stably maintain the thickness of the liquid crystal layer 600, ball spacers or column spacers may be further provided to support a cell gap between the first substrate 400 and the second substrate 500. In this case, it is advantageous to position the spacers so as not to distort the phase of the electric field driven liquid crystal lens.

As the first electrodes 401a and 401b having the same width are arranged on the first substrate 400 and the voltages gradually decreasing from the edge E to the center O of the lens region L are applied to the first electrodes 401a and 401b, a gentle vertical electric field is created between the first electrodes 401a and 401b and the second electrode 501 and a slight horizontal electric field is created between the neighboring first electrodes 401a and 401b. Consequently, a gentle lateral electric field may be observed, in which the intensity of the electric field is high at the edge E of the lens region L and is low at the center O of the lens region L.

Representing the length of optical paths of liquid crystals aligned on a per position basis of an electric field, the edge E of the lens region L has the shortest optical path, and the center O of the lens region L has the longest optical path. Accordingly, it can be appreciated that the electric field driven liquid crystal lens has a shape similar to a gentle parabolic lens. Here, the voltages applied to the first electrodes 401a and 401b and the second electrode 501 causes behavior of the electric field created by the liquid crystal molecules, making a refractive index of light spatially take the form of a parabolic function.

The first electrodes 401a and 401b may be divided into two layers as illustrated, or may be formed in the same layer. Also, the width and distance of the first electrodes 401a and 401b may have equal values, or one of the width and distance may have an unequal value, or both the width and the distance may have unequal values. Changes in the width and distance of the first electrodes may depend on a desired lens profile.

To apply the Fresnel lens to the electric field driven liquid crystal lens while maintaining the above described configuration of the electric field driven liquid crystal lens, voltages are applied to sub regions divided in each lens region to realize lens driving as illustrated in FIG. 5. In this case, in a center sub region, the lowest voltage is applied to the maximum height point of the lens region and the highest voltage is applied to the minimum height point of the lens region. On the other hand, in the remaining sub regions, voltages corresponding to respective desired lens heights are applied sequentially from the maximum height point to the minimum height point of the lens region. In this case, the polarizer plate 700 intercepts light having passed through the discontinuous surface in paths except for the transmission axis of the polarizer plate 700.

Figure 8:
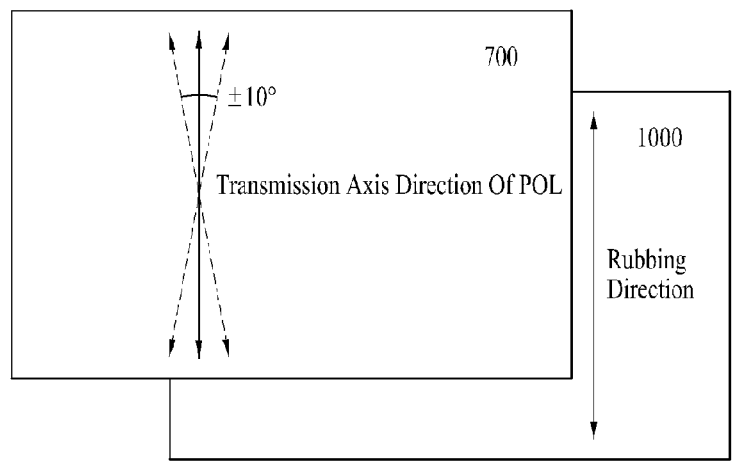
FIG. 8 is a schematic view illustrating a relationship between a rubbing direction of the electric field driven liquid crystal lens and a transmission axis of a polarizer plate above the electric field driven liquid crystal lens.

FIG. 8 is a schematic view illustrating a relationship between a rubbing direction of the electric field driven liquid crystal lens and a transmission axis of an upper polarizer plate.

FIG. 8 illustrates the polarizer plate 700 and the electric field driven liquid crystal lens 1000 in plan view. As will be appreciated from FIG. 8, a transmission axis of the upper polarizer plate 700 may be identical to a rubbing axis of the electric field driven liquid crystal lens 1000, or may be in a range of ±10 degrees from the rubbing axis of the electric field driven liquid crystal lens 1000.

Figure 9:
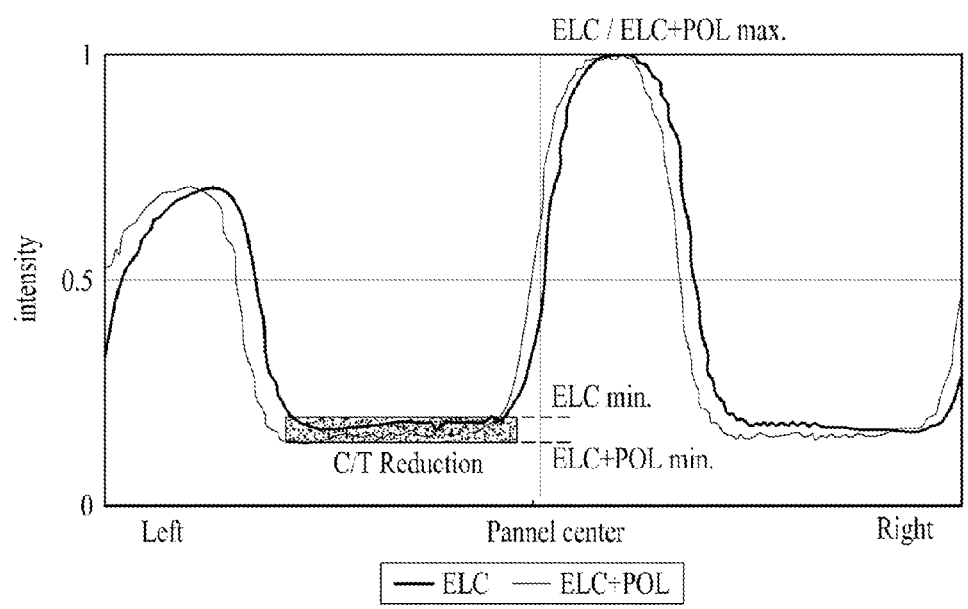
FIG. 9 is a graph comparing the quantity of light and crosstalk on a per region basis between the electric field driven liquid crystal lens of the exemplary embodiment of the present invention and a general electric field driven liquid crystal lens.

FIG. 9 is a graph comparing the quantity of light and crosstalk on a per region basis between the electric field driven liquid crystal lens of the exemplary embodiment of the present invention and a general electric field driven liquid crystal lens.

FIG. 9 and Table 1 illustrate degrees of crosstalk between the electric field driven liquid crystal lens ELC+POL of the exemplary embodiment of the present invention and a general electric field driven liquid crystal lens ELC. FIG. 9 and Table 1 compare two samples, and the electric field driven liquid crystal lens ELC+POL and the general electric field driven liquid crystal lens ELC are placed under the same conditions and in the case of the exemplary embodiment of the present invention, there is further provided a polarizer plate, a transmission axis of which has the same angle as a rubbing axis of a first alignment film.

As shown in Table 1, when the polarizer plate is further provided as compared to the case of providing the electric field driven liquid crystal lens alone, sample no. 1 shows that the exemplary embodiment of the present invention achieves a reduction in crosstalk by 23.7%, and sample no. 2 show that the exemplary embodiment of the present invention achieves a reduction in crosstalk by 19.3%.

TABLE 1

|  | Crosstalk | Notes |
| --- | --- | --- |
| ELC #1 | 17.7 | Crosstalk is reduced by |
| ELC + POL #1 | 13.5 | 23.7% |

TABLE 1-continued

|  | Crosstalk | Notes |
| --- | --- | --- |
| ELC #2 | 19.2 | Crosstalk is reduced by |
| ELC + POL #2 | 15.5 | 19.3% |

Here, crosstalk is calculated by multiplying 100% by a value obtained by dividing the minimum value of the quantity of light per 1 view of the electric field driven liquid crystal lens by the maximum value of the quantity of light per 1 view. That is, this calculation is represented by $$\text{Crosstalk} = \frac{\text{Min(quantity of light per 1 view)}}{\text{Max(quantity of light per 1 view)}} \times 100.$$

As will be appreciated from the above described experimental results of sample no. 1 and sample no. 2, crosstalk is reduced by an average of 21.5% when the rubbing axis of the first alignment film of the electric field driven liquid crystal lens coincides with the transmission axis of the polarizer plate, and thus, an improvement in stereoscopic display visibility is achieved. In addition, it has been found that the crosstalk improvement appears when the transmission axis of the polarizer plate is in a range of ±10 degrees from the rubbing axis of the first alignment film of the electric field driven liquid crystal lens. The graph of FIG. 9 illustrates that the exemplary embodiment of the present invention achieves a reduction in the intensity of crosstalk.

Figure 10:
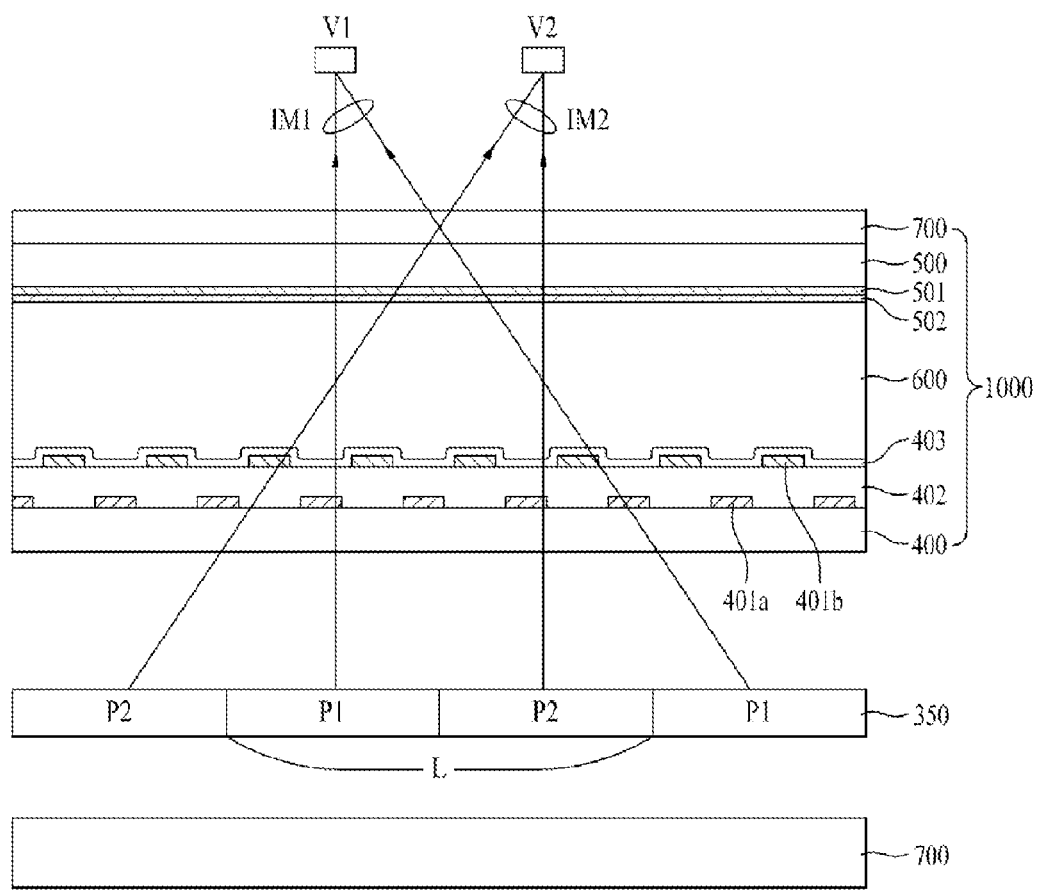
FIG. 10 is a sectional view illustrating a stereoscopic display device including the electric field driven liquid crystal lens according to the exemplary embodiment of the present invention.

FIG. 10 is a sectional view illustrating a stereoscopic display device including the electric field driven liquid crystal lens according to the exemplary embodiment of the present invention.

In FIG. 10, the lens regions L are repeated in a horizontal direction, and the first electrodes 401a and 401b have an elongated bar shape extending in the direction in the longitudinal axis. As illustrated in FIG. 10, the stereoscopic display device of the exemplary embodiment of the present invention includes the electric field driven liquid crystal lens 1000, which is driven upon receiving voltages to thereby function as a lens, a display panel 350, which is disposed below the electric field driven liquid crystal lens 1000 and serves to emit 2D image information, and a light source 650, which is disposed below the display panel 350 and serves to emit light to the display panel 350. If the display panel 350 is a self-illumination device, omission of the light source 650 is possible.

As described above, the polarizer plate 700 is disposed on the second substrate 500 of the electric field driven liquid crystal lens 1000 and has a transmission axis identical to or in a range of ±10 degrees of a rubbing direction of the first alignment film on the first substrate. The polarizer plate 700 serves to control interference light caused by horizontal distortion upon voltage application or a discontinuous surface.

The display panel 350 contains first and second image pixels P1 and P2 alternately and repeatedly arranged to display first and second images IM1 and IM2, respectively. The display panel 350 may be selected from various flat-panel displays including a liquid crystal display (LCD), organic light emitting display (OLED), plasma display panel (PDP), field emission display (FED), etc. The display panel 350 is located below the electric field driven liquid crystal lens 1000, and serves to transmit a 2D image signal to the electric field driven liquid crystal lens 1000.

If the display panel 350 is provided with a polarizer plate, as is preferred, a transmission axis of the polarizer plate above the display panel 350 coincides with a rubbing axis of the electric field driven liquid crystal lens and a transmission axis of the uppermost polarizer plate of the electric field driven liquid crystal lens 1000, in order to assure effective display of an image projected from the display panel 350.

The electric field driven liquid crystal lens 1000 of the exemplary embodiment of the present invention functions to emit a 3D image signal from a 2D image signal according to the profile of a lens surface, and is located on the display panel 350 that forms a 2D image. The electric field driven liquid crystal lens 1000 may selectively emit a 3D image signal or a 2D image signal according to whether or not voltage is applied thereto. Specifically, the electric field driven liquid crystal lens 1000 has a switching function to display a 2D image when no voltage is applied, or a 3D image when voltage is applied.

In the meantime, when voltages, ranging from the above-described threshold voltage (i.e., AC square wave voltage having a peak value of 1.4~2V) to the highest voltage (i.e., AC square wave voltage having a peak value of 2.5~10V), are applied to the plurality of first electrodes 401a and 401b provided in the electric field driven liquid crystal lens 1000 and a ground voltage is applied to the second electrode 501, the electric field driven liquid crystal lens 1000 functions similar to an optical parabolic lens, thereby transmitting the first and second images IM1 and IM2 from the display panel 350 to first and second viewing zones V1 and V2, respectively. If a distance between the first viewing zone V1 and the second viewing zone V2 is set to a distance between the viewer's eyes, the viewer can combine the first and second images IM1 and IM2 transmitted to the first and second viewing zones V1 and V2, thereby perceiving a 3D image based on binocular disparity.

On the other hand, when no voltage is applied to the first electrodes 401a and 401b and the second electrode 501, the electric field driven liquid crystal lens 1000 simply serves as a transparent layer to directly display the first and second images IM1 and IM2 of the display panel 350 without refraction. Accordingly, the first and second images IM1 and IM2 are directly transmitted to the viewer regardless of viewing zones and thus, the viewer perceives a 2-dimensional image.

In the drawing, one lens region L of the electric field driven liquid crystal lens 1000 has a width corresponding to a total width of two pixels P1 and P2 of the display panel 350 located below the electric field driven liquid crystal lens 1000. Also, a plurality of pixels may correspond to the lens region L. In addition, the lens regions L may be tilted at a predetermined angle with respect to the pixels, and may be arranged stepwise with respect to the pixels (more particularly, the lens region of an nth pixel horizontal line is shifted from an (n+1)th pixel horizontal line by a predetermined distance).

The lens region L is defined to have a width corresponding to a pitch P, and the plurality of lens regions L with the same pitch are periodically repeated in a given direction (for example, in a horizontal direction as illustrated in FIG. 4). Here, "pitch P" means a horizontal width of a single lens region L. Here, the lens region L does not have a physical convex-lens shape, but has lens effects obtained when liquid crystals are aligned by an electric field. In FIG. 10, the above described lens regions L are horizontally repeated at an interval of a pitch P.

As apparent from the above description, an electric field driven liquid crystal lens and a stereoscopic display device using the same according to the present invention have the following effects.

Firstly, to assure a precise and stable profile of the electric field driven liquid crystal lens, a lower plate is provided with first finely split electrodes and different voltages are applied to the first electrodes, such that a vertical electric field is created between the first electrodes and a second electrode formed on an upper plate, providing the electric field driven liquid crystal lens with a gentle parabolic lens shape.

Secondly, to reduce the quantity of liquid crystals, a configuration of a Fresnel lens is adopted, in which each lens region is divided into a plurality of sub regions each having the maximum height point. As a result, cell gap thickness and quantity of liquid crystals used are reduced.

Thirdly, in the above described finely split electrode configuration, a horizontal electric field may be created by a voltage difference between the first electrodes on the lower plate, causing liquid crystals to be distorted horizontally when voltage is applied and also, in the case of the Fresnel lens, a discontinuous lens surface may occur. In order to prevent horizontal distortion and discontinuous lens surface, the electric field driven liquid crystal lens is provided with a polarizer plate, a transmission axis of which is identical to a rubbing axis of the electric field driven liquid crystal lens or in a range of a predetermined angle from the rubbing axis. The polarizer plate intercepts a path of light deviated from the transmission axis thereof. As a result, crosstalk is reduced and improved 3D (stereoscopic) display effects are achieved.

It will be apparent to those skilled in the art that various modifications and variations can be made in the electric field driven liquid crystal lens and stereoscopic display device using the same of the present invention without departing from the spirit or scope of the invention. Thus, it is intended that the present invention cover the modifications and variations of this invention provided they come within the scope of the appended claims and their equivalents.

What is claimed is:

1. A stereoscopic display device comprising:
a display panel to emit a 2-dimensional (2D) image signal; and
an electric field driven liquid crystal lens that converts the 2D image signal into a 3-dimensional (3D) image signal, the electric field driven liquid crystal lens comprising:
a first substrate and a second substrate arranged opposite each other;
a first plurality of split electrodes formed on the first substrate, each of the first plurality of split electrodes corresponding to one of a plurality of lens regions;
a second plurality of split electrodes formed on the first plurality of split electrodes, each of the second plurality of split electrodes corresponding to one of the plurality of lens regions;
a second electrode formed over an entire first surface of the second substrate;
a first alignment film formed over an entire surface of the first substrate including the first and second plurality of split electrodes, the first alignment film having a first rubbing direction;
a liquid crystal layer disposed between the first substrate and the second substrate; and
a polarizer plate formed on a second surface of the second substrate, the polarizer plate having a transmission axis that is in a range of ±10 degrees from the first rubbing direction.

2. The stereoscopic display device according to claim 1, wherein a transmission axis of polarized light is identical to a rubbing direction of a first alignment film included in the electric field driven liquid crystal lens when the polarized light is transmitted from the display panel to the electric field driven liquid crystal lens.

3. The stereoscopic display device according to claim 1, wherein the first alignment film has the same rubbing direction as a longitudinal direction of the first plurality of split electrodes.

4. The stereoscopic display device according to claim 1, wherein the first alignment film has a rubbing direction perpendicular to a longitudinal direction of the first plurality of split electrodes.

5. The stereoscopic display device according to claim 1, further comprising a second alignment film formed on the second electrode.

6. The stereoscopic display device according to claim 5, wherein the second alignment film has a rubbing direction anti-parallel to the rubbing direction of the first alignment film.

7. The stereoscopic display device according to claim 1, further comprising a voltage source to apply differing voltages to the first and second plurality of split electrodes.

8. The stereoscopic display device according to claim 7, wherein the voltage source applies voltages that gradually increase from a center of the lens to the edge of the lens.

9. The stereoscopic display device according to claim 7, wherein the voltage source applies different voltages to a plurality of sub regions divided in each lens region to provide the respective sub regions with different lens shapes.

10. The stereoscopic display device according to claim 1, wherein an insulating film is disposed between the first and second plurality of split electrodes.

\* \* \* \* \*